Dec. 4, 1956  F. B. LOUK  2,772,435
CURVED SURFACE WIPER
Filed Feb. 24, 1953

INVENTOR.
FREDERICK B. LOUK
BY R. W. Hodgson

United States Patent Office 2,772,435
Patented Dec. 4, 1956

2,772,435
CURVED SURFACE WIPER
Frederick B. Louk, Los Angeles, Calif.
Application February 24, 1953, Serial No. 338,323
5 Claims. (Cl. 15—245)

This invention relates generally to wiper devices and, more particularly, relates to a device adapted to wipe a curved surface having progressively varying contours, such as an automobile.

Heretofore, it has been necessary to use wiping cloths composed of fabric or chamois-like leather for wiping an automobile dry of the rinsing water used in the cleaning operation. Such materials have the disadvantages of leaving lint and/or streaks upon the wiped surfaces and requiring repeated rinsings and wringings of themselves in order to maintain them in a clean condition. Some attempts have been made to use compressed air or heating chambers for fast drying of the vehicle but the cost and disappointing results have eliminated these methods from commercial consideration. The ordinary squeegee-like wiper is unsuitable for wiping a curved surface because of the inflexibility of the wiper relative to the curvature of the surface; although a wiper could be preshaped to fit any one given surface curvature, and a small amount of flexibility is inherent in any rubber-bladed wiper, a wiper suitable for wiping all of the surfaces of an automobile or other curved object must be easily conformable to progressively varying contours and degrees of curvature and yet have sufficient resiliency to return to virtually its original shape.

My invention comprises a resilient wiper means, made of rubber or like substance that is highly flexible and free of lint, a pressure-applying means in cooperable relation to the wiper means, and a biasing spring means for maintaining reactive pressure over the effective length of the wiper means as said wiper means is moved over a curved surface, thereby returning the wiper means to virtually its original shape.

From the above brief general description, it will be obvious to those skilled in the art that the above-mentioned prior art disadvantages are completely or virtually completely overcome in and through the use of my invention.

With the above points in mind, it is the principal object of this invention to provide a simple, inexpensive, easily operated, curved surface wiper device which is adapted for wiping the surface of a streamlined modern automobile.

Another object of this invention is to provide an improved means for effectively connecting the pressure-applying means to the wiper blade assembly whereby lost-motion action is freely permitted over the entire length of the wiper blade assembly.

Other and allied objects will be clear to those skilled in the art after a careful consideration of the following description and the appended drawings and claims.

In order to facilitate understanding of my invention, reference will be made to the following drawings, in which.

Figure 1:
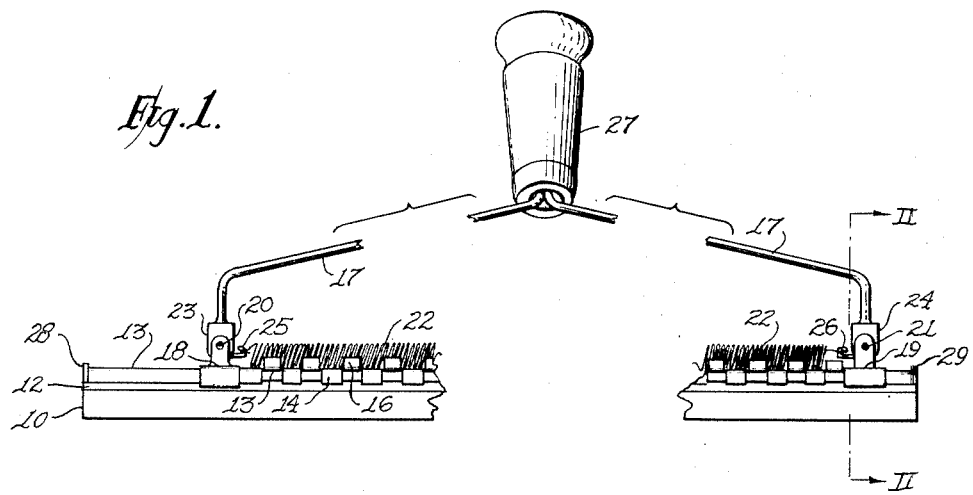
Fig. 1 is a front elevational view of one preferred embodiment of my invention.
Figure 2:
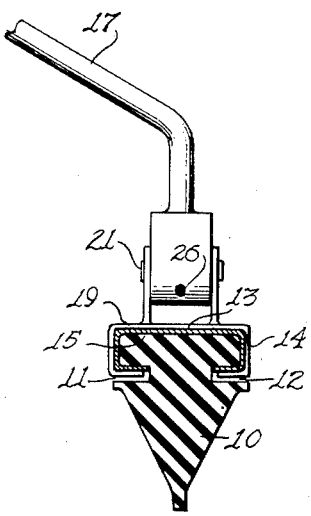
Fig. 2 is a transverse section taken substantially on line II—II of Fig. 1.

Referring to Figs. 1 and 2 of the drawings, there is shown an elongated wiper blade 10, constructed of some resilient material such as rubber, and having oppositely disposed longitudinally extending lateral recesses 11 and 12. Extending along the entire length of the wiper blade 10 is a flexible wiper blade holder 13 provided with lower lateral fingers, such as indicated by the numeral 14, that are clamped around the wiper blade top edge 15, which is formed by the lateral recesses 11 and 12. The wiper blade holder 13 is provided with an upper longitudinal channel by means of a plurality of upper lateral fingers, such as indicated by the numeral 16. A pressure-applying yoke 17 is provided with pivotally mounted channel members 18 and 19 which slidably engage the wiper blade holder 13 near the ends thereof, the pivot pins 20 and 21 extending through the channel members 18 and 19 and the yoke 17 in such a manner that the pivoting action is in the longitudinal direction of the wiper blade holder 13. The channel members 18 and 19 permit longitudinal sliding of the wiper blade holder 13 to allow for longitudinal lost-motion as the wiper blade 10 conforms to a curved surface, and also permit pivoting of the ends of the wiper blade 10 with respect to the yoke 17 so that the entire length of the wiper blade 10 can conform to the curved surface. A biasing spring 22 is connected to the arms 23 and 24 of the yoke 17 at the hooks 25 and 26 and extends in longitudinal contact with the wiper blade holder 13, said spring 22 being retained from lateral motion by the longitudinal channel formed by the upper lateral fingers 16 of the wiper blade holder 13. A handle 27 is fastened to the yoke 17 for ease in manipulation and application of force.

In operation, the preferred embodiment of my invention, as illustrated in Figs. 1 and 2 will perform as follows:

As pressure is applied by means of the yoke 17 to the wiper blade holder 13, the wiper blade 10 will conform to the curved surface to be wiped, due to the resiliency of both the wiper blade and the wiper blade holder. Since the arcuate length of the surface is greater than the linear length of the distance between the yoke arms 23 and 24, there is a tendency for the resilient wiper blade 10 to stretch. This stretching force will cause the wiper blade 10 and wiper blade holder 13 to longitudinally slide inward through the channel members 18 and 19 in what is known as lost-motion. To prevent the wiper blade holder 13 from sliding completely through the channel members, the ends of the wiper blade holder 13 are provided with slightly raised edges 28 and 29 to operate as stops. The pivot pins 20 and 21 will permit the channel members 18 and 19 to pivot so that the entire length of the wiper blade 10 will conform to a curved surface that is larger than the surface encompassed between the yoke arms 23 and 24. The biasing spring 22 provides substantially uniform reactive pressure along the length of the wiper blade holder 13 between the yoke arms 23 and 24, maintaining the wiper blade 10 in firm continuous contact with the curved surface and returning the wiper blade to its original straight shape upon removal from the curved surface.

Figure 3:
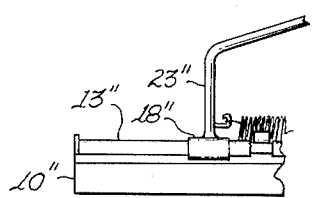
Fig. 3 is a front elevational, fragmentary, view of a second embodiment of my invention, similar in aspect to that shown in Fig. 1, illustrating a different mode of obtaining relative movement of the wiper blade assembly with respect to the pressure-applying means.
Figure 4:
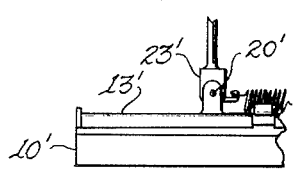
Fig. 4 is a front elevational, fragmentary, view, similar to Fig. 3, illustrating another form of connection between the wiper blade assembly and the pressure-applying means for lost-motion allowance.
Figure 5:
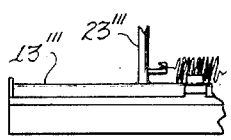
Fig. 5 is a front elevational fragmentary view of another means of connection between the pressure-applying means and the wiper blade assembly.

In Figs. 3, 4 and 5, there are shown several modifications of the connections between the yoke arms and the wiper blade holder. Whereas the preferred embodiment of my invention includes both pivotal relation of the channel members to the yoke arms and a slidable relation of at least one of the channel members to the wiper blade holder, either or both of those relations may be omitted without substantially altering the basic principle of operation of the device. As shown in Fig. 4, the yoke arm 23' is secured to the wiper blade holder 13' instead of being slidably engaged as in Figs. 1 and 2. The pivot pin 20' still allows pivoting of the wiper blade assembly relative to the yoke arm 23' so that the entire length of the wiper blade 10' may conform to a curved surface, but the practical use of the device is limited to surfaces having only large radii of curvature since the elasticity of the wiper blade assembly prevents stretching over more than a relatively slight arcuate distance.

As shown in Fig. 3, the yoke arm 23" is slidably engaged with the wiper blade holder 13" by means of the channel member 18" so that surfaces having smaller radii of curvature can be effectively wiped due to the allowance of lost-motion sliding of the wiper blade holder 13" within the channel member 18", but the lack of pivoting action prevents the most complete and effective use of the entire length of the wiper blade 10" on a curved surface.

As shown in Fig. 5, the yoke arm 23''' is secured to the wiper blade holder 13''' directly, there being neither slidable engagement by a channel member or pivoting action. As a result, neither the lost-motion sliding action of the modification illustrated in Fig. 3 nor the pivoting action of the modification illustrated in Fig. 4, nor the combination of both such actions in the preferred embodiment illustrated in Figs. 1 and 2 is obtained. However, in all of the modified embodiments shown, the wiper blade assembly will conform to a curved surface of one degree or another, and a substantially uniform pressure along the effective length of the wiper blade assembly will be reactively applied by the biasing spring.

It should be noted that the examples described and illustrated herein are illustrative only and numerous modifications within the scope of the present inventions will occur to those skilled in the art and all such are intended to be included and comprehended herein.

It should be noted that the words "curved surface" "curved" and "convex," as used in the present specification and claims, are not to be taken in a limiting sense. They are to be construed as also including a plane surface.

I do not intend to limit my invention to those embodiments described and illustrated. The scope of my invention is to be limited only by the appended claims.

I claim:

1. Curved surface wiper means effectively adapted to wipe a convex surface of varying radii of curvature, comprising: elongated wiper blade means being resilient for conforming to a curved surface; flexible wiper blade holder means in effective longitudinal holding connection with said wiper blade means; pressure-applying yoke means provided with effectively pivotally mounted channel means is slidable retaining and pressure-applying relationship with respect to said wiper blade holder means; and biasing tension spring means in cooperable spring biasing relation between said yoke means and said wiper blade holder means whereby to effectively reactively maintain contact of said wiper blade means with a curved surface.

2. Surface wiper means effectively adapted to wipe a curved convex surface with varying contours, comprising: longitudinal resilient wiper blade means; flexible wiper blade holder means in effective longitudinal holding connection with said wiper blade means; pressure-applying yoke means provided with pivotally mounted channel means in slidable retaining and pressure-applying relationship with respect to said wiper blade holder means near the ends thereof; and biasing tension spring means in cooperable spring biasing relation between said yoke means and said wiper blade holder means whereby to effectively reactively maintain contact of said wiper blade means with a curved surface.

3. Surface wiper means effectively adapted to wipe a curved convex surface with varying contours, comprising: elongated wiper blade means being resilient, for conforming to a curved surface; flexible wiper blade holder means provided with lower finger means in gripping relationship with respect to said wiper blade means and provided with upper longitudinal channel means; pressure-applying yoke means provided with channel means in slidable retaining and pressure-applying relationship with respect to said wiper blade holder means; and biasing tension spring means attached to said yoke means whereby to effectively reactively maintain contact of said wiper blade means with a curved surface, said spring means being in longitudinal contact with said wiper blade holder means and laterally retained by said upper longitudinal channel means of said wiper blade holder means.

4. Curved surface wiper means effectively adapted to wipe a convex surface of varying radii of curvature, comprising: longitudinal resident wiper blade means; flexible wiper blade holder means provided with lower finger means in gripping relationship with respect to said wiper blade means and provided with upper longitudinal channel means; pressure-applying yoke means provided with pivotally mounted channel means in slidable retaining and pressure-applying relationship with respect to said wiper blade holder means; and biasing tension spring means attached to said yoke means whereby to effectively reactively maintain contact of said wiper blade means with a curved surface, said spring means being in longitudinal contact with said wiper blade holder means and laterally retained by said upper longitudinal channel means of said wiper blade holder means.

5. Curved surface wiper means effectively adapted to wipe a convex surface of varying radii of curvature, comprising: longitudinal resilient wiper blade means; flexible wiper blade holder means provided with lower finger means in gripping relationship with respect to said wiper blade means and provided with upper longitudinal channel means; pressure-applying yoke means in effective cooperable pressure-applying relation to said wiper blade holder means; and biasing tension spring means attached to said yoke means whereby to effectively reactively maintain contact of said wiper blade means with a curved surface, said spring means being in longitudinal contact with said wiper blade holder means and laterally retained by said upper longitudinal channel means of said wiper blade holder means.

References Cited in the file of this patent

UNITED STATES PATENTS

| 2,537,411 | Klingler | Jan. 9, 1951 |
| 2,598,971 | Carey | June 3, 1952 |
| 2,649,605 | Scinta et al. | Aug. 25, 1953 |
| 2,658,223 | Enochian | Nov. 10, 1953 |

FOREIGN PATENTS

| 995,933 | France | of 1951 |